United States Patent Office 3,129,089
Patented Apr. 14, 1964

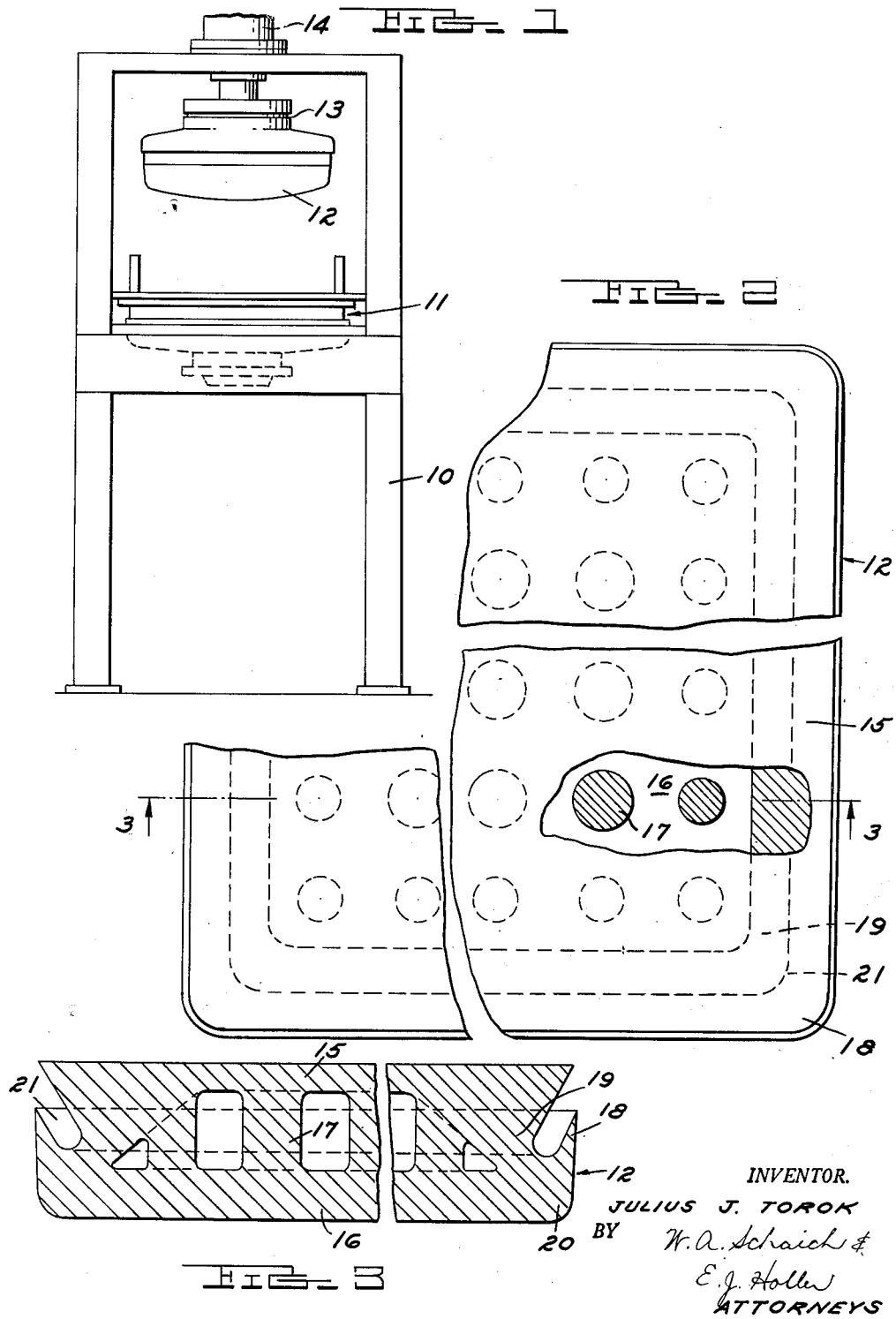

3,129,089
FORMING GLASS ARTICLES
Julius J. Torok, Toledo, Ohio, assignor, by mesne assignments, to Owens-Illinois Glass Company, Toledo, Ohio, a corporation of Ohio
Filed Dec. 30, 1959, Ser. No. 862,824
12 Claims. (Cl. 65—319)

This invention relates to forming glass articles and particularly to forming glass articles having a base portion and a peripheral flange portion.

One of the methods of making glass articles is by pressing a gob of hot molten glass in a mold having an internal molding surface corresponding to the external configuration of the article to be formed. The pressing is accomplished by moving a plunger downward into contact with the glass to displace the glass to form the glass article. The plunger has an external molding surface corresponding to the internal configuration of the article which is to be formed. When utilizing this method to form glass articles, it is extremely important to control the temperature of the glass forming surfaces. If the glass forming surfaces are too hot, the glass will stick thereto and if the glass forming surfaces are too cold, the glass will crizzle or form what are commonly known as "chill wrinkles." It is also important that the surfaces do not operate at too high a temperature since such a condition is found to increase the cycle time.

It can thus be seen that it is desirable and necessary to operate the glass forming surfaces at temperatures between the extremes which will cause sticking or crizzling in order that the glass articles may be successfully formed at low cost. Since there are other variables such as glass temperature and atmospheric conditions which affect the temperature of the glass forming surfaces, it is preferred to operate the glass forming surfaces at a much narrower range of temperatures so that the glass forming surfaces are well within the extreme limits of temperature thereby providing ample working tolerance for the variables which are more difficult to control.

When such a method of pressing a gob of glass is used in making a glass article which has certain portions thereof connected by sharply curved portions, such as glass block halves and television tube face plates which comprise a base portion and a flange portion connected to the base portion by relatively sharply curved portions, the problem of maintaining a uniform temperature on the molding surfaces becomes more difficult. There is a tendency for the glass forming surfaces in the area of juncture of the base portion and flange portion to be extremely hot relative to the median mold working temperature and for the glass forming surfaces on the upper edge of the flange portion to be extremely cold relative to the median mold working temperature. This is accentuated where efforts are made to lower the temperature of the glass forming surfaces in the area of juncture since such lowering of the temperature tends to further lower the temperature of the glass forming surface adjacent the upper end of the flange portion.

Recently, certain new materials have been used for making molding surfaces because of their ease of machinability and their resistance to wear and chemical reaction when in contact with glass. However, such materials usually have a very high conductivity so that a plunger made of such materials must be made of relatively great thickness making the problem of obtaining isothermal operation even more difficult.

It is an object of this invention to provide an apparatus for forming glass articles having a base and peripheral flange wherein the glass forming surfaces of the plunger do not exceed the limits of working temperature of the glass; wherein the tendency of the glass to stick or to become crizzled is substantially lessened; and wherein the newer materials can be utilized without having a plunger of excessive weight.

In the drawings:

FIG. 1 is an elevational view of a portion of a molding apparatus embodying my invention.

FIG. 2 is a fragmentary top plan view of the plunger utilized in the apparatus shown in FIG. 1.

FIG. 3 is a fragmentary sectional view taken along the line 3—3 in FIG. 2.

Figure 4:
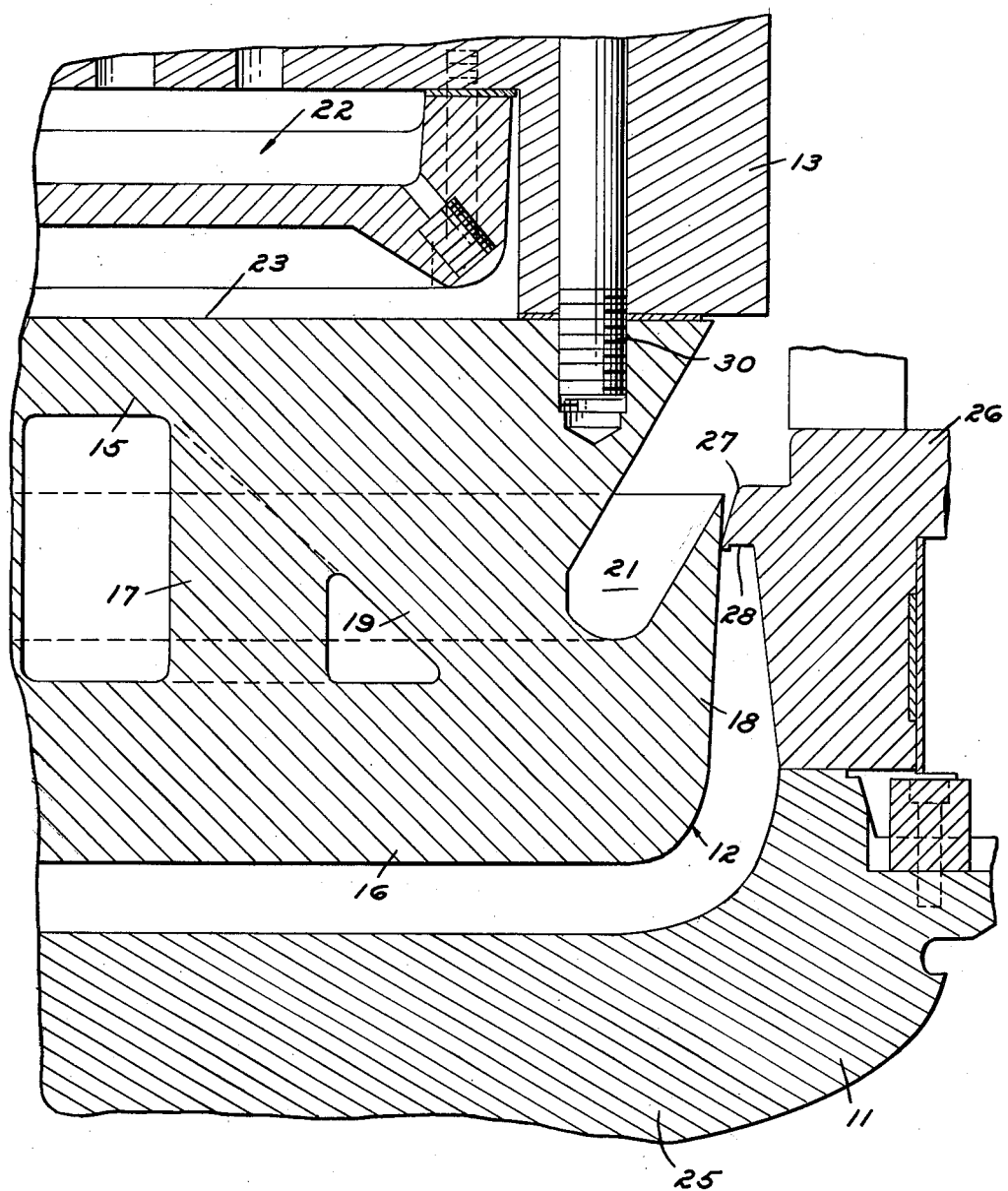
FIG. 4 is a fragmentary vertical sectional view of the apparatus shown in FIG. 1 with the plunger in glass pressing position.

Referring to FIG. 1, a conventional apparatus for forming the glass article such as a glass block half or a television tube face plate comprises a base 10 for a mold 11 having an internal molding surface corresponding to the external configuration of the glass article which is being formed. The apparatus including a plunger 12 which is adapted to be moved downwardly and upwardly into and out of the mold 11. Plunger 12 is mounted on a head 13 for vertical reciprocating movement by a suitable means such as hydraulic cylinder 14.

Referring to FIGS. 2 and 3, plunger 12 comprises a one-piece body of a suitable heat conducting material and comprises an upper plate or section 15 of substantially uniform thickness throughout and a lower plate or section 16 spaced below the upper section 15 and having substantially uniform thickness throughout. The upper and lower sections 15, 16 are connected by integral columns 17 which extend between the sections at generally right angles to the planes of said members. The lower section 16 includes a flange 18 extending upwardly from the periphery thereof at a relatively sharp angle on the order of 90°. Plunger 12 also includes an integral wall 19 which extends from the area of juncture 20 of the flange 18 at an angle lying substantially along the bisector of the angle between the base portion and the flange portion. The wall 19 is imperforate thereby isolating the area between the columns 17 from the exterior of the plunger. As shown in FIG. 3, the lower section 16 is substantially coextensive with the upper section 15 so that flange 18 cooperates with the periphery of top section 15 to form a downwardly and inwardly extending slot 21 along the entire periphery of the plunger.

As shown in FIGS. 1 and 4, plunger 12 is supported on head 13 by bolts 30. Head 13 includes means 22 for moving a liquid coolant across a top surface 23 of the plunger 12 to cool the plunger. The specific means for cooling the top surface can be of any well-known type and does not form any part of the invention.

As further seen in FIG. 4, the central portion and flange 18 of lower section 16 cooperate to form the external molding surface of the plunger which corresponds to the internal molding surface of the article which is to be formed. The mold 11 with which the plunger 12 cooperates comprises two parts, namely, a base 25 and a ring 26 which cooperate to form the surface for molding the exterior of the article which is to be formed. The ring 26 includes an inwardly extending projection 27 that engages the flange 18 of the plunger 12 and forms a shoulder 28 on the mold which limits the movement of the glass upwardly thereby forming the upper edge of the flange of the glass article.

The plunger 12 made in accordance with the invention cooperates with the mold 11 to form a glass article to the desired configuration without sticking or crizzling of the glass. The molding surfaces of the plunger operate at temperatures well within the permissible limits for sticking or crizzling.

Although I do not wish to be bound by the theory involved, in my opinion, these beneficial results are obtained by the utilization of the uniform removal of heat from the lower section 16 by conduction through columns 17; by the removal of a greater quantity of heat from the area of juncture 20 through solid wall 19 and by the prevention of excessive cooling of the upper edge of flange 18 due to the presence of the slot 21.

The plunger made in accordance with the invention utilizing columns 17 permits the use of materials having a high heat conductivity without resulting in a plunger of excessive weight. Such materials which have come into common use for molding glass articles have the advantage that they are resistant to physical and chemical action with the glass. A sample of such a material is an aluminum bronze alloy comprising substantially the following composition: copper 67%, nickel 17%, aluminum 7.2%, zinc 8.43%, iron .37% and manganese .01%. Alloys of this type are commercially available under the trade name Minox. In such compositions the amount of copper varies as much as 20% while the zinc may or may not be provided. The aluminum is added to provide oxidation resistance and can vary widely.

The reduction in weight by utilizing my invention may be illustrated by noting that a solid plunger of the above mentioned aluminum bronze alloy made to provide a temperature differential between the plunger molding surface and the top surface of the plunger of approximately 80° F. must be approximately five inches in thickness whereas the same temperature differential can be obtained in a plunger of my invention by an overall thickness of one inch, wherein each of the upper and lower members is approximately one-quarter inch in thickness and each of the connecting columns is approximately 0.18 square inch in cross sectional area. The reduction in weight thus is approximately 70 percent in the case of a material such as the aluminum bronze alloy.

It may be noted that from the practical standpoint it would be impossible to obtain good temperature distribution in a solid plunger made of the above aluminum bronze alloy because the thickness of the plunger would be greater than the height of the flange on the glass article being formed. This would necessitate drilling portions of the plunger and attempting to cool the interior of the plunger with water by squirting the water into the plunger. With such an arrangement, the proper control of temperature is almost impossible in a plunger of such great thickness. Thus, the invention permits not only the reduction in weight of the plunger but makes the control of temperature practically possible when a material of high heat conductivity is used to make the plunger.

It is preferred that the plunger 12 be made in a single piece by casting. This can be accomplished by providing a suitable mold and pattern. The pattern for forming the columns 17 may comprise sand or other insulating material and may be left in position after molding or may be removed by tapping a suitable opening in the upper plate 15, removing the material and closing the opening. It can be appreciated that the plunger can also be made in separate pieces which are joined together, the welds or joints between the various pieces being brazed or formed in any other suitable manner to provide a thermal bond between the pieces. A basic requirement of the invention is that the material connecting the upper and lower plates of the plunger must have a thermal conductivity which is a fraction of that of the lower or glass forming plate.

Although I do not wish to be bound by the theory involved in the use of columns and the like, in my opinion, the beneficial results of reduction of weight with a material of high heat conductivity are achieved because there is a reduction in the heat conducting area resulting in the ability to reduce the length of the heat conducting area for the passage of the same amount of heat.

Although the apparatus has been described in connection with a generally rectangular article or a generally rectangular mold and plunger, it should be apparent that it is also applicable to articles which are of other cross section.

I claim:
1. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises an imperforate lower member having a central portion the external surface of which is adapted to contact the glass, an imperforate upper member overlying and spaced from the central portion of the lower member, the upper surface of said upper member being adapted to be cooled by a liquid coolant, and a plurality of spaced columns extending between and thermally bonded to said upper and lower members, said columns forming paths of heat flow between said lower member and said upper member.

2. The combination set forth in claim 1 wherein the total horizontal cross sectional area of said columns is a fraction of the cross section of the upper member.

3. The combination set forth in claim 1 wherein said lower member includes a flange portion extending upwardly from the periphery of said central portion of said lower member and thermally bonded thereto, and a wall extending from the area of juncture of the central portion and flange portion to the upper member and thermally bonded to said central portion and the upper member.

4. The combination set forth in claim 3 wherein said wall is imperforate thereby isolating the area between the upper member and the central portion of the lower member and surrounding said columns.

5. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises an imperforate lower member having a central portion of substantially uniform thickness throughout, an imperforate upper member overlying and spaced from the central portion of the lower member, said upper member having a substantially uniform thickness throughout, the upper surface of said upper member being adapted to be cooled by a liquid coolant, and a plurality of isolated spaced columns extending between said upper member and said lower member at generally right angles thereto, said columns being thermally bonded to said upper member and said lower member and forming paths for flow of heat from said lower member to said upper member.

6. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises a one-piece body having an imperforate lower section with a central portion forming the base portion of the plunger, an imperforate upper section overlying and spaced from the central portion of said lower section, the upper surface of said upper member being adapted to be cooled by a liquid coolant, and a plurality of spaced integral columns extending between said upper and lower sections and forming paths for the flow of heat.

7. The combination set forth in claim 6 including an integral wall extending between the upper section and the area of juncture of the flange portion and central portion of the lower section of said plunger.

8. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises a one-piece body having an imperforate upper section of substantially uniform thickness throughout, an imperforate lower section positioned below the upper section and having a substantially uniform thickness throughout, said lower section including a flange portion extending upwardly from the periphery thereof, a plurality of spaced integral columns extending between the upper section and the lower section at substantially right angles to the planes of the sections, and an integral imperforate wall extending between the upper section and the area of juncture of the flange portion and central portion of the lower section.

9. The combination set forth in claim 8 wherein the upper section and the central portion of the lower section are substantially coextensive so that said flange portion and said wall form a downwardly and inwardly extending slot extending around the entire periphery of the plunger.

10. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises an imperforate lower member having a central portion the external surface of which is adapted to contact the glass, an imperforate upper member overlying and spaced from the central portion of the lower member, and at least one connecting member extending between said upper and lower members and thermally bonded thereto, said connecting member having a cross sectional area substantially less than the corresponding cross-sectional areas of said upper and lower members, said connecting member forming a path of heat flow between said lower member and said upper member and having a lesser thermal conductivity than said lower member.

11. In an apparatus for forming a glass article having a base and a peripheral flange by pressing a plunger downwardly into contact with the gob of glass placed in a mold having an internal molding surface corresponding to the external configuration of the spaced article which is to be formed, said plunger having an external molding surface corresponding to the internal configuration of the article which is to be formed and comprising a base portion and a flange portion extending upwardly from the periphery of said base portion, and means for applying a liquid coolant to the outer surface of said plunger to cool said plunger, the improvement wherein said plunger comprises an imperforate lower member having a central portion the external surface of which is adapted to contact the glass, an imperforate upper member overlying and spaced from the central portion of the lower member, the upper surface of said upper member being adapted to be cooled by said liquid coolant, and a plurality of columns extending between and thermally bonded to said upper and lower members, said columns forming paths of heat flow between said lower member and said upper member.

12. In an apparatus for forming a glass article having a base and a peripheral flange by pressing a plunger downwardly into contact with the gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, the improvement wherein said plunger comprises an imperforate lower member having a central portion of substantially uniform thickness throughout, an imperforate upper member overlying and spaced from the central portion of the lower member, said upper member having a substantially uniform thickness throughout, the upper surface of said upper member being adapted to be cooled by a liquid coolant, a plurality of spaced isolated columns extending between said upper member and said lower member at generally right angles thereto, said columns being thermally bonded to said upper member and said lower member and forming paths for flow of heat from said lower member to said upper member, and an imperforate wall surrounding said columns and extending between and thermally bonded to the upper and lower member, said upper and lower members extending radially outwardly beyond said last-mentioned wall and having portions defining a downwardly and inwardly extending slot surrounding said plunger.

References Cited in the file of this patent
UNITED STATES PATENTS

| 199,583 | Siemens | Jan. 22, 1878 |
| 1,685,546 | Lee | Sept. 25, 1928 |
| 1,857,540 | Hardenberg | May 10, 1932 |
| 2,046,372 | Engstrom | July 7, 1936 |
| 2,853,835 | Tallent | Sept. 30, 1958 |
| 3,003,287 | Torok | Oct. 10, 1961 |